Sept. 19, 1961 S. M. BADER 3,000,524
TRAILER
Filed Feb. 14, 1958 3 Sheets-Sheet 1
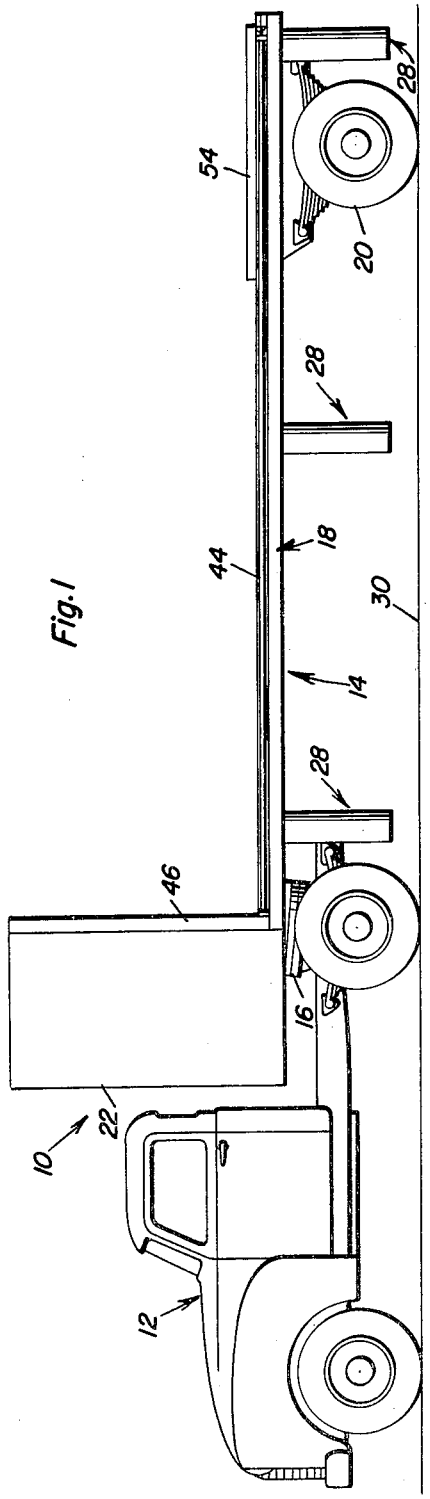
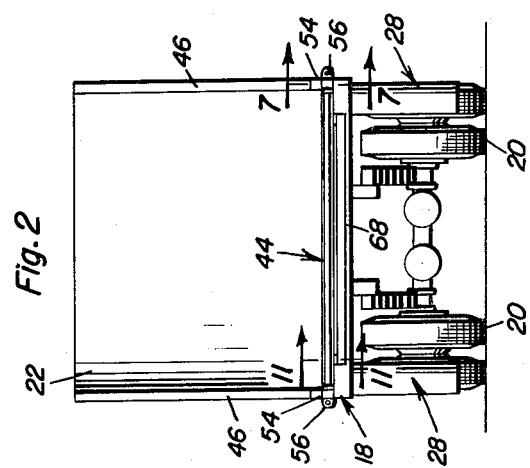
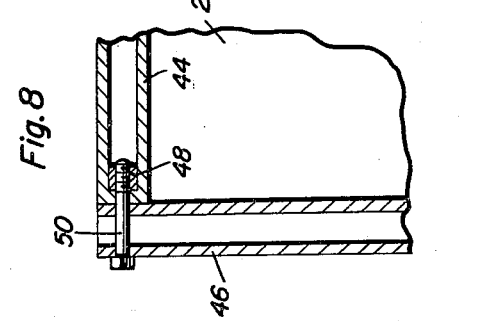
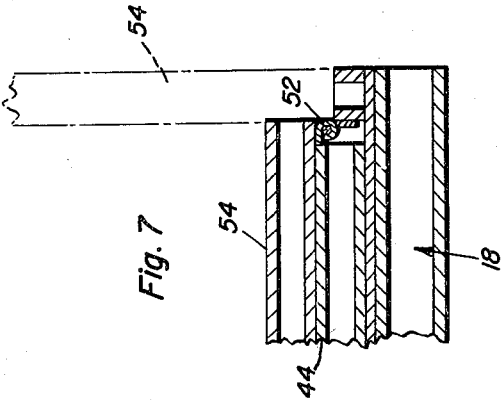
Samuel M. Bader
INVENTOR.
BY *Clarence A. O'Brien*
*and Harvey B. Jackson*
Attorneys

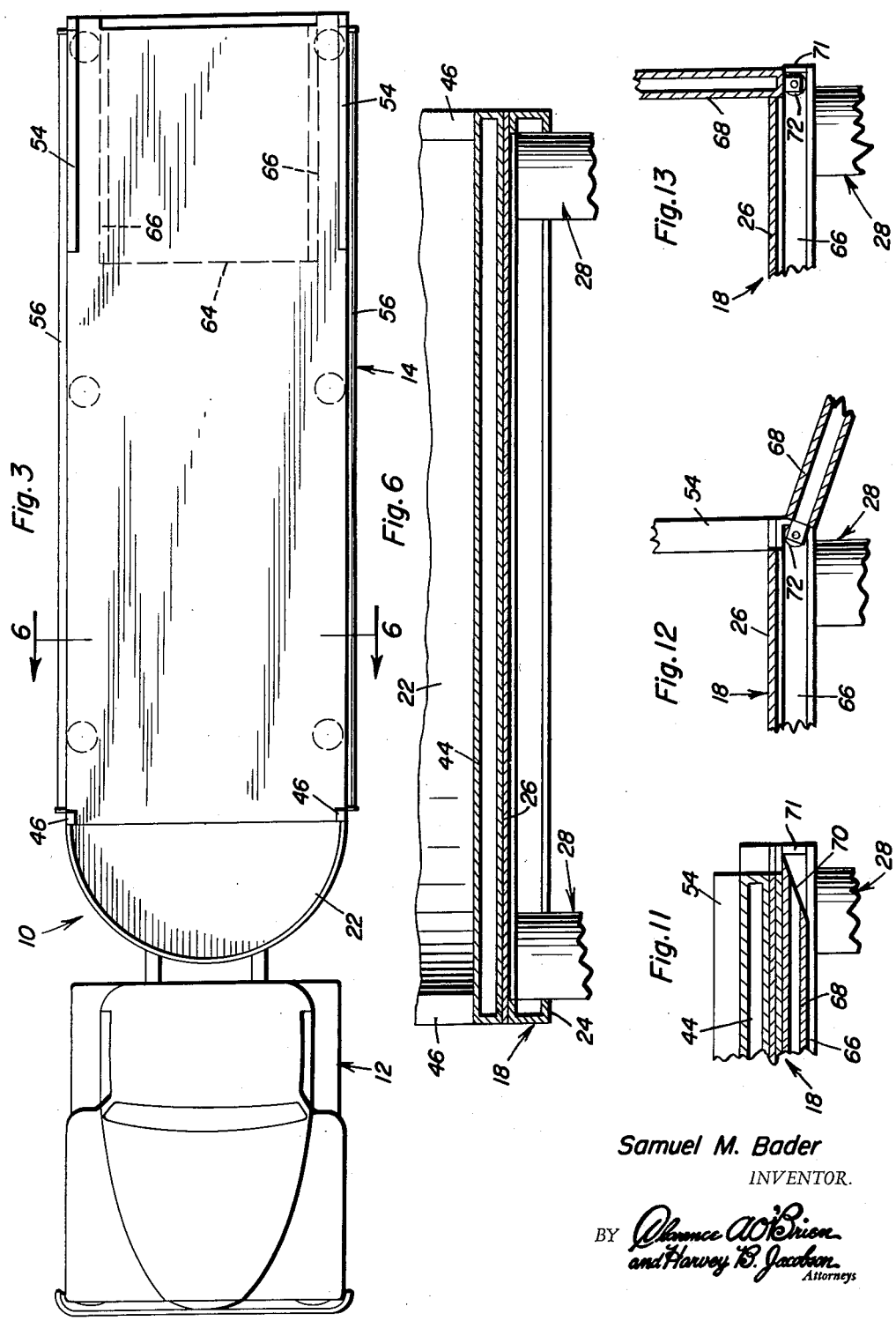

Sept. 19, 1961 S. M. BADER 3,000,524
TRAILER
Filed Feb. 14, 1958 3 Sheets-Sheet 3
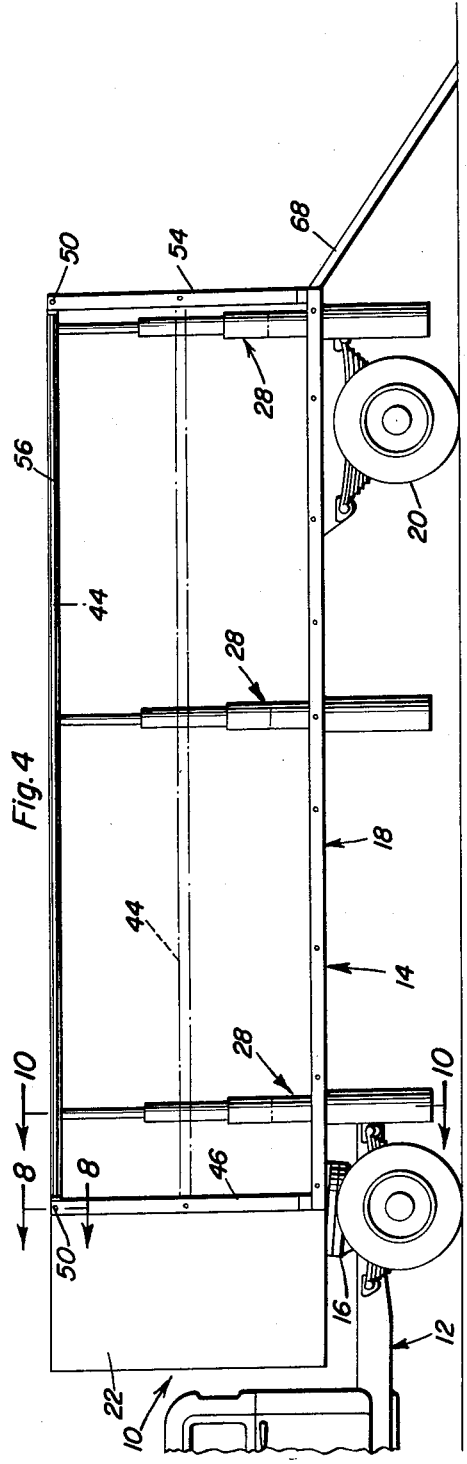
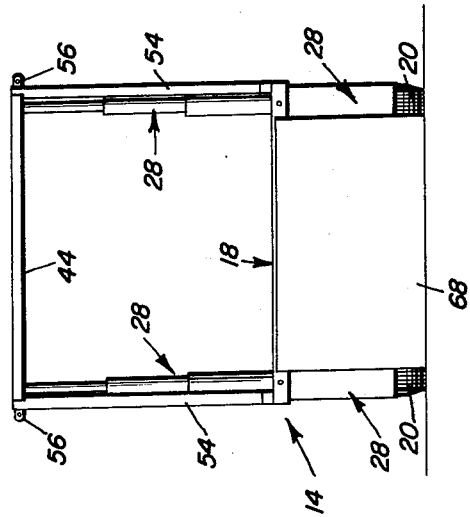
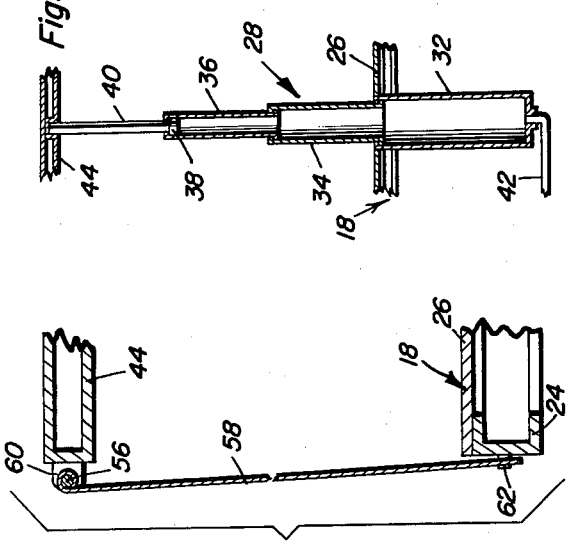
Samuel M. Bader
INVENTOR.

United States Patent Office 3,000,524
Patented Sept. 19, 1961

3,000,524
TRAILER
Samuel M. Bader, Elyria, Ohio, assignor to The Carlson Fabrication & Welding Co., Inc., Lorain, Ohio, a corporation of Ohio
Filed Feb. 14, 1958, Ser. No. 715,403
8 Claims. (Cl. 214—512)

This invention relates in general to new and useful improvements in vehicle construction, and more specifically to an improved truck body construction.

At the present time there are primarily two types of truck bodies, a flat bed and a van. The flat bed has many advantages. One of the primary advantages of the flat bed type body construction is that it may accommodate heavy loads and if necessary, the loads may extend over the sides of the body and the height of the article carried by the body is limited only by the clearance of bridges and the like under which the truck is to pass. On the other hand, the flat bed has many disadvantages including the fact that no means are provided for the sheltering of the goods being transported.

With respect to the van, the van has the convenience of being in the form of an enclosure whereby the material being transported by the truck is fully protected. On the other hand, the van is limited as to the size of article which it may carry, being restricted both as to height and the width of the article.

In addition to the van and flat bed type of body construction, there is a specialized van or modified van wherein a second floor is positioned at substantially half the height of the van whereby small animals and the like many be carried. The use of this van is limited to the specialized requirements although it is highly desirable for its specialized purpose.

As will be seen from the foregoing, if a single truck or trailer is to meet all requirements, it would normally have to be in the form of three trucks. It is therefore the primary object of this invention to provide an improved truck body construction which includes a flat bed type body having disposed in overlying relation thereto a combined roof and floor forming member or platform, the member having connected thereto means carried by the flat type bed body for raising and lowering it between a position directly overlying the flat bed type body and a roof forming position, as well as intermediate positions whereby the truck body may be readily converted for many uses.

Another object of this invention is to provide an improved truck body construction, the truck body being of such a nature whereby it may be used as a flat bed or as a van, as desired, and at the same time is provided with a movable floor forming member which may be elevated as desired to clear small articles which are being transported in order that two tiers of the articles may be mounted on the same truck body.

Still another object of this invention is to provide an improved truck body construction which includes a rear storage area, there being normally stored in the rear storage area a ramp, the ramp being so mounted with respect to the truck body whereby it may be swung down into a ramp forming ground engaging position or may be selectively swung into a vertical position to form a tailgate.

A further object of this invention is to provide a convertible truck body construction, which truck body construction includes a flat bed type body, a combined roof and floor forming platform directly overlying and engageable in face-to-face relation with the flat bed type body, there being carried by the flat bed type body a plurality of fluid motors of the extensible type, the fluid motors extending down below the flat bed type body and being connected to the platform for the purpose of elevating the platform to any desired position between its position directly overlying the flat bed type body and a roof forming position whereby the truck body may be selectively converted into any type of truck body desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a tractor-trailer assembly wherein the trailer is provided with a truck body conforming to the present invention, the body being in its flat bed position;

FIGURE 2 is a rear elevational view of the trailer of FIGURE 1 and shows further the details thereof;

FIGURE 3 is a top plan view of the tractor-trailer of FIGURE 1 and shows the general arrangement of various components of the trailer body construction;

FIGURE 4 is a side elevational view of the trailer body construction of FIGURE 1 and shows the combined roof and floor forming member thereof elevated to its roof forming position, an intermediate position of the combined roof and floor forming member being shown by broken lines, and the ramp being shown in its ramp forming position;

FIGURE 5 is a rear elevational view of the trailer of FIGURE 4 and shows further the details thereof;

FIGURE 6 is an enlarged fragmentary transverse sectional view taken substantially upon the plane indicated by the section line 6—6 of FIGURE 3 and shows the relationship of the combined roof and floor forming member with respect to the flat bed type body when the combined roof and floor forming member is in its lowered flat bed forming position;

FIGURE 7 is an enlarged fragmentary sectional view taken substantially upon the plane indicated by the section line 7—7 of FIGURE 2 and shows the details of a standard for supporting the combined roof and floor forming member in an elevated position, the standard being shown in an elevated position by broken lines;

FIGURE 8 is an enlarged fragmentary transverse sectional view taken substantially upon the plane indicated by the section line 8—8 of FIGURE 4 and shows the connection between the roof and floor forming member and one of the supporting standards therefor when in its roof forming position;

FIGURE 9 is an enlarged fragmentary sectional view taken through a side edge portion of the trailer body construction when the roof and floor forming member is in its roof forming position and shows the details of a side curtain which extends between the roof and floor forming member and the flat bed type body;

FIGURE 10 is a fragmentary vertical sectional view taken substantially upon the plane indicated by the section line 10—10 of FIGURE 4 and shows the details of one of the fluid motors when it is in its extended position;

FIGURE 11 is an enlarged fragmentary vertical sectional view taken substantially upon the plane indicated by the section line 11—11 of FIGURE 2 and shows the details of the rear part of the flat bed type body including the mounting of a ramp in a rear storage area thereof, the ramp being shown in its stored position;

FIGURE 12 is an enlarged fragmentary sectional view similar to FIGURE 11 and shows the ramp in its ramp holding position; and FIGURE 13 is an enlarged fragmentary sectional view similar to FIGURE 11 and shows the ramp in an upright tailgate forming position;

Referring now to the drawings in detail, it will be seen that there is illustrated in FIGURE 1 a tractor-trailer combination which is referred to in general by the reference numeral 10. The tractor-trailer combination 10 includes a conventional tractor 12 and a special trailer 14, the trailer 14 embodying the truck body construction which is the subject of this invention. The trailer 14 is connected to the tractor 12 by means of a fifth wheel construction 16.

The trailer 14 includes a flat bed type body 18 which is supported at the forward end thereof by means of the fifth wheel construction 16 and at the rear thereof by means of a conventional wheel assembly 20. The flat bed type body 18 also includes a forward nose construction 22.

As is best shown in FIGURE 6, the flat bed type body 18 includes a lower frame 24 which is formed of channel members. Overlying the frame 24 is a floor forming plate 26.

Secured to the flat bed body 18 at longitudinally spaced intervals adjacent opposite sides thereof is a plurality of fluid motors of the telescoped extensible type, the fluid motors being referred to in general by the reference numeral 28. It is to be noted that the fluid motors 28 depend below the flat bed type body 18, but terminate sufficiently above a road surface 30 providing the necessary ground clearance. Inasmuch as the fluid motors 28 are identical, only one of the fluid motors will be described in detail.

Referring now to FIGURE 10 in particular, it will be seen that the fluid motor 28 includes a cylinder 32 which is secured to the floor 26 in depending relation. Disposed within the cylinder 32 and extendible therefrom is a first tubular piston 34. Normally telescoped within the first tubular piston 34 is a second tubular piston 36. Normally telescoped within the second tubular piston 34 is a piston 38 and a piston rod 40. Suitably connected to the cylinder 32 is a fluid supply line 42 which will be connected to a suitable pressurized fluid source. (Not shown.) Inasmuch as the fluid motor 28 is of a conventional type, further description thereof is believed to be unnecessary.

The trailer body construction also includes a combined roof floor forming member 44. The combined roof and floor forming member 44 may be of any construction, but must be of sufficient rigidity to be self-sustaining when supported either at the corners only or along the sides thereof at longitudinally spaced intervals. The upper ends of the piston rods 40 are secured to the underside of the combined roof and floor forming member or platform 44, as is best shown in FIGURE 10.

As is best shown in FIGURE 1, the combined roof and floor forming member 44 may directly overlie and be resting upon the flat bed type body 18. When the combined roof and floor forming member 44 is in this position, the trailer 14 is of the flat bed type. On the other hand, if it is desired that the trailer 14 be of the van type, the combined roof and floor forming member 44 may be elevated to a position whereby it is in alignment with the upper part of the nose portion 22, as is best shown in FIGURE 4. This is accomplished by extending the fluid motors 28.

As is best shown in FIGURE 5, when the fluid motors 28 are extended, they project up into the general confines of the body of the trailer 14. In order that the fluid motors 28 may be retracted to their normal out-of-the-way positions, if desired, the fluid motors 28 may have a releasable connection with the combined roof and floor forming member 44. In either event, in order to facilitate the support of the combined roof and floor forming member 44, there is provided immediately adjacent the nose portion 22 on opposite sides of the flat bed type body 18 standards 46. The standards 46 may be releasably secured to the combined roof and floor forming member 44 in any desired manner. In FIGURE 8 there is illustrated a typical connection which includes a nut member 48 positioned in the combined roof and floor forming member 44, the nut member 48 receiving a threaded end of a bolt 50 which extends through the upper part of the standard 46.

The rear end of the flat bed type body 18 has hingedly secured thereto, as at 52 in FIGURE 7 rear standards 54. The rear standards 54 may be folded to horizontal positions overlying the flat bed type body 18, as is best shown in FIGURE 1, so that they may be moved to an out-of-the-way position when the combined roof and floor forming member 44 is in its flat bed body forming position. The combined roof and floor forming member 14 will be releasably secured to the standard 54 in the manner illustrated in FIGURE 8.

As is best shown in FIGURE 4, the combined roof and floor forming member 44 is not limited to the flat bed forming position of FIGURE 1 or the roof forming position of FIGURE 4, but may be positioned in any position intermediate the two. If desired, the standards 46 and 54 will be provided with a plurality of bores for receiving the bolts 50 at any desired height.

As is best illustrated in FIGURE 9, extending along opposite sides of the combined roof and body forming member 44 are reels 56 on which there are reeled side curtains 58. The reels 56 are supported by suitable brackets 60 and the side curtains 58 have at their lower ends releasable fasteners 62 releasably securing them to the sides of the flat bed type body 18. It will be readily understood that the side curtains 58 may be secured to the flat bed type body 18 and then the combined roof and floor forming member 44 elevated so that the side curtains 58 are payed out at the same time the combined roof and floor forming member 44 is elevated. The side curtains 58 form the sides of the trailer 14 to protect the cargo thereof.

The flat bed type of body 18 also includes a rear storage area which is shown by dotted lines in FIGURE 3 and which is referred to by the reference numeral 64. The rear storage area 64 is below the floor 26 and is defined by a pair of transversely spaced, longitudinally extending guides 66. Normally stored in the rear storage area 64 is a ramp 68. The ramp 68 may be of any construction, but must have sufficient rigidity to support loads passing thereover. Normally the ramp 68 is entirely confined within the rear storage area 64. However, as is shown in FIGURE 12 it may be pulled out into a downwardly and rearwardly sloping ground engaging ramp forming position. As is best shown in FIGURE 11, the rear edge of the ramp 68 is tapered as at 70 to make proper contact with the ground.

The rear storage area 64 is defined by a transverse stop member 71. Extending to opposite sides of the ramps 68 at the forward ends thereof are combined stop and pivot rollers 72. When the ramp 68 is pulled all of the way out, the rollers 72 engage the stop member 71 and thus limits the outward movement of the ramp 68 and permits the pivoting thereof with respect to the flat bed type body 18. After the trailer 14 has been loaded, the ramp 68 may be pivoted to a vertical position, such as is shown in FIGURE 13, to form a tailgate.

When the trailer 14 is to be used in its flat bed position of FIGURE 1, it may be loaded and unloaded in the normal manner or the ramp 68 may be moved to its ramp forming position of FIGURE 12 and then the trailer 14 loaded and unloaded. On the other hand, if it is desired that the trailer 14 be converted into a van, the combined roof and floor forming member 44 is elevated to its roof forming position of FIGURE 4 and the trailer utilized as a van. On the other hand, when relatively low height cargo is to be shipped, two layers thereof may be positioned on the trailer 14 at one time. When this is desired, the combined roof and floor forming member 44 is lowered to its position resting upon the flat bed type body 18. The first layer or load is placed on the combined roof and floor forming member 44 in the same manner as it would be applied to the flat bed type body 18. After the combined roof and floor member 44 has been fully loaded, the fluid motors 28 are extended and the combined roof and floor forming member 44 is elevated to a position whereby it will clear a second load. The second load is then moved onto the floor 26. If desired, the combined roof and floor forming member 44 may be secured to the standards 46 and 54 once the combined roof and floor forming member has been elevated. The unloading operation is reverse from the foregoing.

While the truck body construction, which is the subject of this invention, has been illustrated and described with respect to a semi-trailer, such as the trailer 14, it is to be understood that the invention is not intended to be so limited. The body construction may be used in conjunction with ordinary types of trucks, semi-trailers or full trailers. It will be readily apparent that the desirable features of the body construction will be the same irrespective of the type truck or trailer in which it is used.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A truck body construction comprising a flat bed type body, supporting wheels underlying said body and secured thereto in supporting relation, a combined roof and floor forming member overlying said flat bed type body, and means carried by said flat bed type body for raising and lowering said combined roof and floor forming member between a position directly lying on said flat bed type body to a roof forming position and intermediate positions, said raising and lowering means being disposed entirely beneath the upper surface of said roof and flooring member whereby the entire upper surface thereof will be free from projections which would limit the flooring member from supporting loads wider than the flooring member, reeled up side curtains on said combined floor and roof forming member adapted to be unreeled, and curtain fasteners on said curtains and flat bed-type body for causing said curtains to unreel in response to raising of said combined floor and roof forming member, upstanding permanent support means on one end of said body for releasable engagement with said roof and floor forming member when raised above its lowermost position and upstanding retractible rigid support means on the other end of said body for engagement with said roof and floor forming member when raised above its lowermost position.

2. A truck body construction comprising a flat bed type body, supporting wheels underlying said body and secured thereto in suporting relation, a combined roof and floor forming member overlying said flat bed type body, and means carried by said flat bed type body for raising and lowering said combined roof and floor forming member between a position directly lying on said flat bed type body to a roof forming position and intermediate positions, said raising and lowering means being disposed entirely beneath the upper surface of said roof and flooring member whereby the entire upper surface thereof will be free from projections which would limit the flooring member from supporting loads wider than the flooring member, said means being in the form of a plurality of upright extensible fluid motors on said flat bed-type body extensible and collapsible to raise and lower said combined floor and roof forming member, said flat bed type body having forward and rear ends, upstanding permanent rigid support means on one end of said body for releasable engagement with said roof and floor forming member when raised above its lowermost position and upstanding retractible rigid support means on the other end of said body for engagement with said roof and floor forming member when raised above its lowermost position, means for detachably attaching said combined roof and floor forming member to said support means in roof forming and intermediate positions, and means detachably attaching said motors to said combined floor and roof forming members for raising and lowering said combined floor and roof forming members when attached thereto and for collapsing into out of the way position when detached therefrom when said combined floor and roof forming member is attached to said supports.

3. The combination of claim 2 including reeled up side curtains on said combined floor and roof forming member adapted to be unreeled, and curtain fasteners on said curtains and said flat bed-type body for causing said curtains to unreel in response to raising of said combined floor and roof forming member.

4. A truck body construction comprising a flat bed type body, supporting wheels underlying said body and secured thereto in supporting relation, a combined roof and floor forming member overlying said flat bed type body, and means carried by said flat bed type body for raising and lowering said combined roof and floor forming member between a position directly lying on said flat bed type body to a roof forming position and intermediate positions, said raising and lowering means being disposed entirely beneath the upper surface of said roof and flooring member whereby the entire upper surface thereof will be free from projections which would limit the flooring member from supporting loads wider than the flooring member, upstanding permanent support means on one end of said body for releasable engagement with said roof and floor forming member when raised above its lowermost position and upstanding retractible rigid support means on the other end of said body for engagement with said roof and floor forming member when raised above its lowermost position.

5. A truck body construction comprising a flat bed type body, supporting wheels underlying said body and secured thereto in supporting relation, a combined roof and floor forming member overlying said flat bed type body, and means carried by said flat bed type body for raising and lowering said combined roof and floor forming member between a position directly lying on said flat bed type body to a roof forming position and intermediate positions, said raising and lowering means being disposed entirely beneath the upper surface of said roof and flooring member whereby the entire upper surface thereof will be free from projections which would limit the flooring member from supporting loads wider than the flooring member, said means being in the form of a plurality of extensible fluid motors, upstanding permanent support means on one end of said body for releasable engagement with said roof and floor forming member when raised above its lowermost position and upstanding retractible rigid support means on the other end of said body for engagement with said roof and floor forming member when raised above its lowermost position.

6. A truck body construction comprising a flat bed type body, supporting wheels underlying said body and secured thereto in supporting relation, a combined roof and floor forming member overlying said flat bed type body, and means carried by said flat bed type body for raising and lowering said combined roof and floor forming member between a position directly lying on said flat bed type body to a roof forming position and intermediate positions, said raising and lowering means being disposed entirely beneath the upper surface of said roof and flooring member whereby the entire upper surface thereof will be free from projections which would limit the flooring member from supporting loads wider than the flooring member, said means being in the form of a plurality of extensible fluid motors, said fluid motors being secured to said flat bed type body in depending relation, upstanding permanent support means on one end of said body for releasable engagement with said roof and floor forming member when raised above its lowermost position and upstanding retractible rigid support means on the other end of said body for engagement with said roof and floor forming member when raised above its lowermost position.

7. The combination of claim 4 wherein said flat bed body includes a rear storage area disposed beneath said roof and floor member, a ramp slidably secured within said rear storage area and movable to a rearwardly extending and downwardly inclined position for facilitating the loading of said truck body and an upwardly extending tail gate positioned to facilitate the retaining of a load on said truck body.

8. The combination of claim 7 wherein said ramp has a combined stop and pivot connection with said flat bed type body whereby said ramp, when in the extended position, may be pivoted between a downwardly inclined position and a substantially upstanding position.

References Cited in the file of this patent

UNITED STATES PATENTS

| | | |
|---|---|---|
| 1,427,189 | Bourgeois | Aug. 29, 1922 |
| 1,573,172 | Laffey | Feb. 16, 1926 |
| 2,370,427 | Sherry | Feb. 27, 1945 |
| 2,715,044 | Neidetcher | Aug. 9, 1955 |

FOREIGN PATENTS

| | | |
|---|---|---|
| 119,025 | Sweden | June 10, 1947 |
| 900,012 | France | June 18, 1945 |